United States Patent [19]

Schappler

[11] Patent Number: 5,782,541
[45] Date of Patent: Jul. 21, 1998

[54] PRESSURE CONTROL PROCESS AND APPARATUS

[75] Inventor: Harmut Schappler, Hanover, Germany

[73] Assignee: Wabco Vermogensverwaltung GmbH, Hanover, Germany

[21] Appl. No.: 512,944

[22] Filed: Aug. 9, 1995

[30] Foreign Application Priority Data

Aug. 16, 1994 [DE] Germany .................. 44 28 929.4

[51] Int. Cl.$^6$ .................................................. B60T 13/74
[52] U.S. Cl. ............................ 303/3; 303/15; 303/20; 303/155
[58] Field of Search .................................. 303/3, 15, 20, 303/119.1, 155, 199; 364/426.02

[56] References Cited

U.S. PATENT DOCUMENTS

| | | | |
|---|---|---|---|
| 5,405,182 | 4/1995 | Ewe et al. | 303/15 |
| 5,452,735 | 9/1995 | Gamble et al. | 137/1 |
| 5,560,688 | 10/1996 | Schappler et al. | 303/3 |

FOREIGN PATENT DOCUMENTS

| | | |
|---|---|---|
| 00 14 369 B1 | 12/1981 | European Pat. Off. . |
| 0 075 657 A3 | 4/1983 | European Pat. Off. . |
| 0 188 686 A3 | 7/1986 | European Pat. Off. . |
| 0 226 803 A3 | 7/1987 | European Pat. Off. . |
| 0 233 360 A2 | 8/1987 | European Pat. Off. . |
| 02 04 483 B1 | 1/1990 | European Pat. Off. . |
| 0 408 844 A3 | 1/1991 | European Pat. Off. . |
| 27 32 298 A1 | 2/1979 | Germany . |
| 36 03 810 A1 | 8/1986 | Germany . |
| 36 36 141 A1 | 10/1986 | Germany . |
| 36 36 140 A1 | 4/1988 | Germany . |
| 39 39 038 A1 | 11/1989 | Germany . |
| 40 13 278 A1 | 4/1990 | Germany . |
| 05 89 629 A1 | 9/1993 | Germany . |
| 89 02 384 A1 | 3/1989 | WIPO . |

OTHER PUBLICATIONS

Richl, Helmuth: Trends bei der Entwicklung von Hydraulik–Ventilmagneten. In: O + P Ölhydraulik und Pneumatik 35, 1991, Nr. 8, pp. 613–619.

Forschungsfonds. IN: O + P Ölhydraulik und Pneumatik 35, Nr. 10, pp. 781–782.

Keller, Horst: Adaptive Regelung eines pneumatischen Linearantriebs. In O + P Ölhydraulik und Pneumatik 35, 1994, Nr. 4, pp. 220–225.

*Primary Examiner*—Lee W. Young
*Attorney, Agent, or Firm*—Meltzer, Lippe, Goldstein et al.

[57] ABSTRACT

A process and an apparatus for pressure control, in particular, to adjust braking pressures in a utility vehicle, are proposed. Two individual controllers (10, 11) are assigned respectively to an inlet valve (2) and to a discharge valve (3). A pilot control value consisting of a fixed value $y_v$ and of a memorized value $\Delta y_v$ is additively input to the output values of these controllers. The memorized components $\Delta y_v$ are the integration result of the I (integration) components of the individual controllers (10, 11) for the duration of a pressure increase (inlet valve) or pressure decrease (discharge valve). The memorizing process is ended after approximately five to ten brake applications and the value of $\Delta y_v$ which is then reached is used as an individual pilot control value.

12 Claims, 5 Drawing Sheets

PRESSURE CONTROL PROCESS AND APPARATUS

FIELD OF THE INVENTION

The present invention relates to a process and to an apparatus having a digital control. More specifically, the present invention relates to an apparatus and process for the adjustment of brake pressures in a utility vehicle.

BACKGROUND OF THE INVENTION

In large utility vehicles it is desirable to control the brakes by means of electrical signals instead of pneumatic pressure controls. As a result, the signal transmission is accelerated and the possibilities for intervention and influence of the braking signal are improved.

When actuated by the driver, the braking pedal emits an electrical signal which is processed in an electronic system in order to adjust the braking pressure in the brake cylinders of the vehicle (see DE 36 03 810 A1). In such electric braking systems, there must be a high degree of synchronization, repeatability precision and safety requirements. If an anti-lock braking system (ABS) with usual control cycles of 2 to 5 seconds or automatic slip control (ASR) is available, the pressure modulators or solenoid valves (MV) used for pressure control must be able to function very rapidly so that the desired pressures can be set.

In the simplest case, solenoid valves are used which can be switched open or closed. These valves are actuated electrically and are either fully open or fully closed. The braking pressure can be increased, maintained or lowered using such valves. However, the brake pressure changes are only in steps.

It is also possible to use so-called pressure modulators which are able to set the desired pressures in an analogous manner. However, these are relatively expensive and not especially rapid.

Finally, switching solenoid valves can also be used, but these must be actuated electrically with a frequency higher than their own frequency (e.g. 30 Hz) (see EP 0 014 369 B1). In this manner, the solenoid valve can be operated within a relatively narrow working range in the form of a continuously adjustable throttling point. The comfort of control with such a valve is greater than with a purely open/close valve and the wear of the valve seats is reduced. However, considerable problems occur in the control because such a solenoid valve is subject to delay time, greatly prone to hysteresis, is non-linear, and is sensitive to the limitations of manufacturing tolerances and aging. The operation of the valve is also influenced by the operating temperature. Additional problems in brake pressure adjustment or control in a utility vehicle result from the non-linearity of the transmission path, i.e., the pipe and hose lines, and the volume to be controlled, i.e., the brake cylinder. Thus, for example, pressure oscillations may occur in the presence of a large gradient in volume flow. Additional non-linearities result from the fact that the brake cylinder has a highly changeable volume while working. Finally, temperature equalization effects occur in the brake cylinder even when the solenoid valve is closed, i.e., the brake cylinder pressure changes slowly with temperature changes, even without an increase or decrease in volume flow.

SUMMARY OF THE INVENTION

It is the object of the present invention to provide a pressure control device, in particular for the adjustment of braking pressures in a vehicle, which operates preferably with switching solenoid valves and which is improved with respect to the quality and speed of the control process.

The present invention consists of a process and an apparatus for pressure control which compensate for the reduced performance of the inlet and discharge solenoid valves due to age and wear. The age and wear factors are compensated by taking into account the operating parameters of each valve. The parameters are refined by monitoring the first five to ten braking operations of vehicle and calculating a variable component for each valve. This variable component is fed into the brake control system and modifies the command variable from the driver of the vehicle. Each valve's variable can be stored in a non-volatile memory device for use when the vehicle is next started.

To accomplish this task, two individual controllers are assigned respectively to the inlet valve and to the discharge valve. A pilot control value consisting of a fixed value $y_v$ and of a memorized value $\Delta y_v$ is additively input to the output values of these controllers. The memorized components $\Delta y_v$ are the integration result of the I(integral)-components of the individual controllers (10, 11) for the duration of a pressure increase (inlet valve) or pressure decrease (discharge valve). The memorizing process is ended after approximately five to ten brake applications and the value of $\Delta y_v$ which is then reached is used as an individual pilot control value.

DETAILED DESCRIPTION OF THE INVENTION

Figure 1:
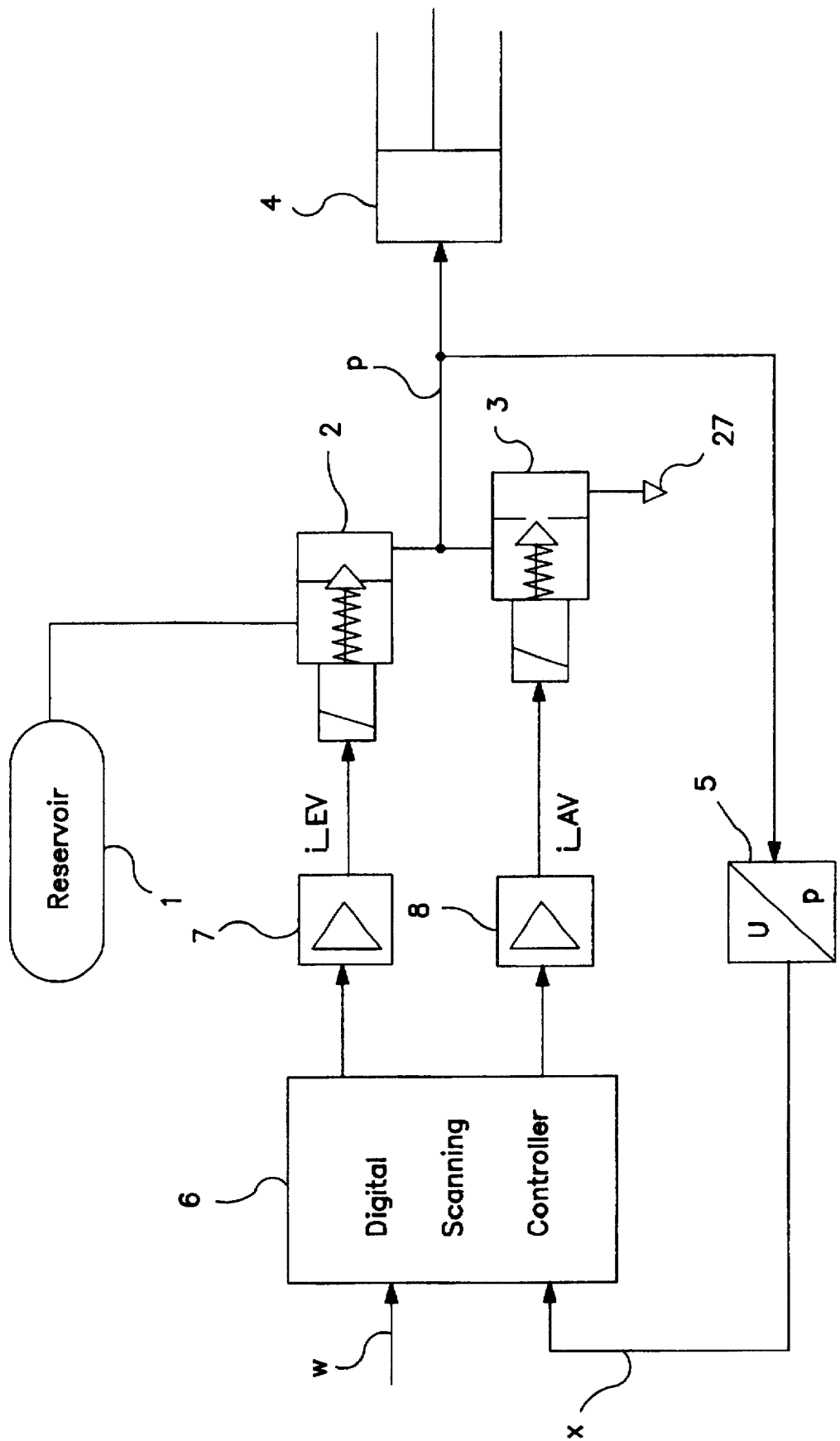
FIG. 1 illustrates a schematic circuit diagram of an electric braking system of a vehicle with a pressure control.

FIG. 1 shows a schematic circuit diagram of a pressure control apparatus. In a brake cylinder (4), a braking pressure, which follows the value of the command variable w, is to be set as rapidly and as precisely as possible. To increase the pressure, an inlet valve (2) in the form of a 2 way solenoid valve is provided which connects a pressure fluid reservoir (1) to the brake cylinder (4). To lower the pressure, a 2 way solenoid discharge valve (3) is used to divert the pressure fluid from the brake cylinder (4) to an outlet (27) The pressure fluid may be either compressed air or oil. To maintain the pressure in the brake cylinder (4) both valves (2, 3) are closed. The actual pressure p in the brake cylinder (4) is transmitted to a pressure sensor (5) where it is converted into a proportional output voltage. The latter is then transmitted, in the form of a value x, to a digital scanning controller (6). The controller (6) compares the command variable w in a known manner with the actual value x and, in case of deviations, transmits corresponding control signals via amplifiers (7, 8) to the valves (2 and 3)

in order to minimize the difference. The controller (6) is therefore designated as a scanning controller because it is provided with analog/digital converters at its inputs and is thus able to process analog input signals. These signals are scanned in a known manner and are converted into a digital number. Further processing is digital, i.e. by computer program.

Figure 2:
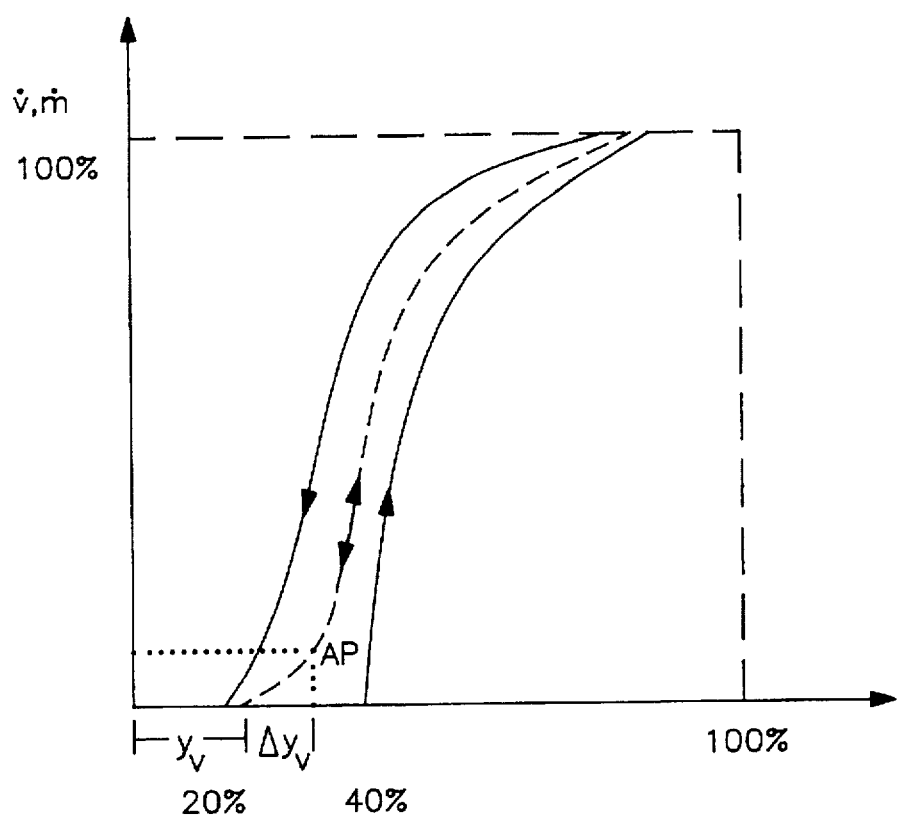
FIGS. 2 and 3 are diagrams illustrating the delay time and the hysteresis behavior of the solenoid valves used (inlet valve EV and discharge valve AV)

In FIG. 2 the characteristic response curve of the inlet valve (EV) (2) is shown. A control current i of 0 to 100% is entered on the abscissa in standard form. The volume flux $\dot{v}$ or the mass flux $\dot{m}$ of 0 to 100 is shown along the ordinate, also in standard form.

As can be seen, the valve begins to open only after an actuation current of about i=40% because of its starting hysteresis. As the current increases the opening occurs at first in a linear manner and later in a non-linear manner with a dropping gradient.

During closing, the same non-linearity occurs and additional hysteresis takes place. With a current value of approximately i=20% the valve is again closed completely.

A corresponding opening and closing behavior also applies to the discharge valve (AV) (see FIG. 3) which is open without electric actuation.

Figure 3:
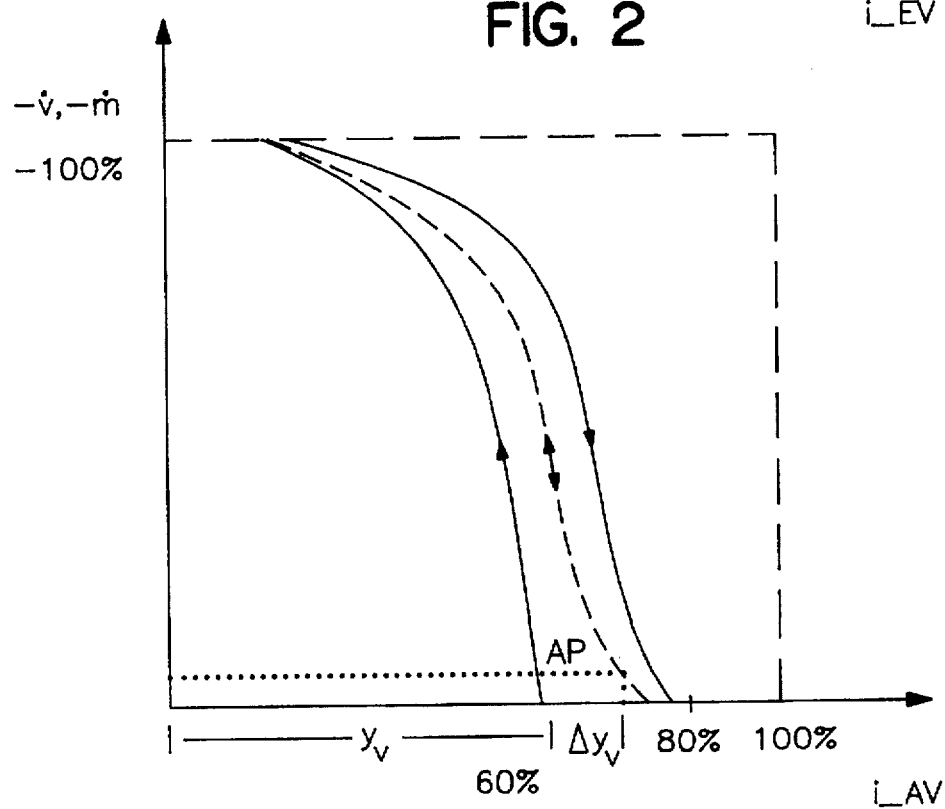

As shown in FIGS. 2 and 3, the inlet and discharge valves have long response delay times at each start or change in pressurization or venting, and therefore introduce a delay time behavior into the control circuit. Only when an opening control current value of approximately 40% of the maximum current value is reached in the actuating magnets, and a corresponding perviousness (opening) of the sealing surface is produced, does a volume/mass flux ($\dot{v}$, $\dot{m}$) of the pressure fluid occur in the brake line.

This characteristic also applies to the discharge valve (AV) where a volume/mass flow begins only when the current decreases to approximately i=60%. To close the discharge valve a current of approximately i=80% is required.

The hysteresis curve, as shown, applies for a slow valve actuation. In case of rapid actuation, such as occurs in actual operation, a median characteristic curve applies, which are indicated in FIGS. 2 and 3 by broken lines.

Figure 5:
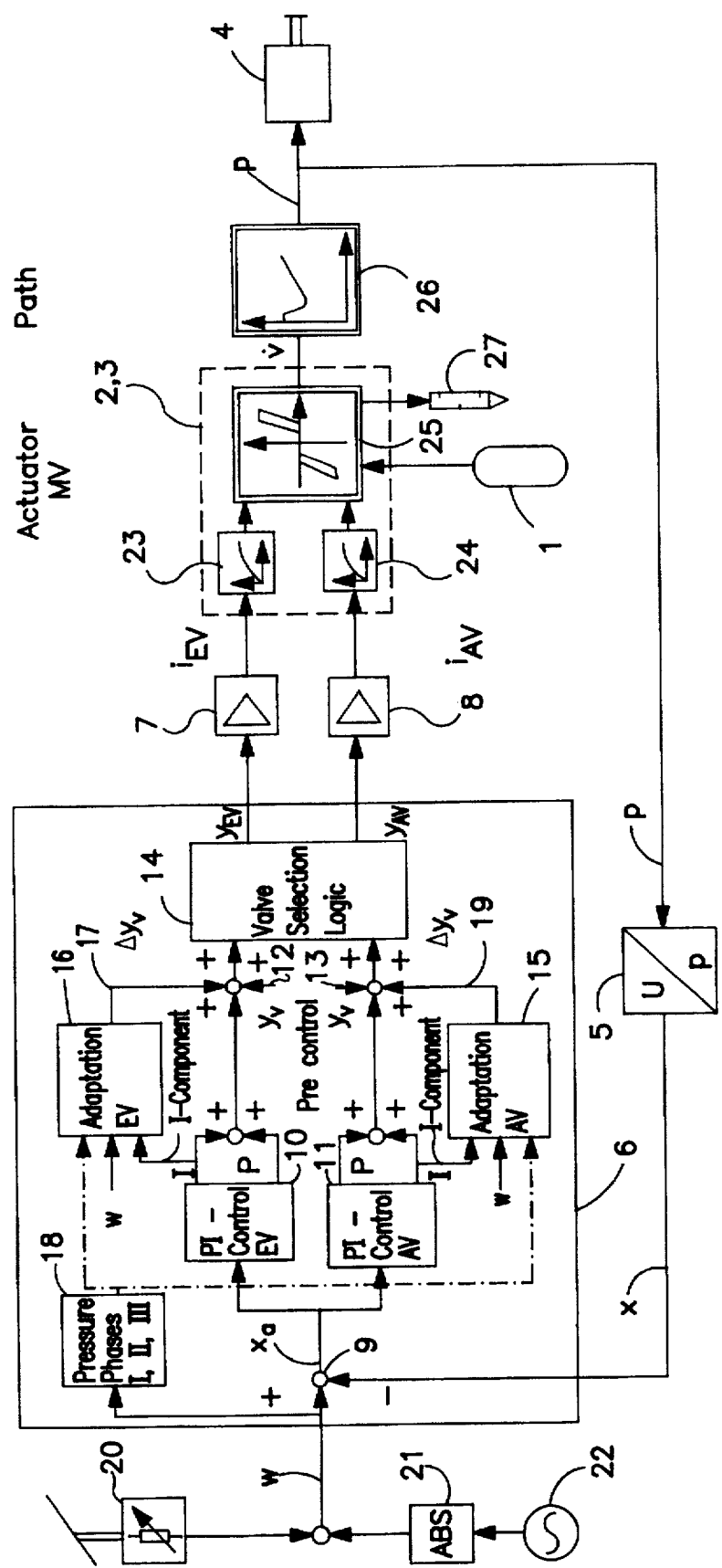
FIG. 5 is a diagram illustrating the pressure control apparatus as well as the other components which are part of the control circuit.

FIGS. 2 and 3 show pilot control currents $y_v$ and $\Delta y_v$ that are added adaptively to the control current (see FIG. 5). These current values are necessary in order to reach the operating point AP when starting from the rest position of the valve (i=0). The operating point is the state in which the sealed seat of the valve is just opening (with the inlet valve EV) or just closing (with the discharge valve AV).

Figure 4:
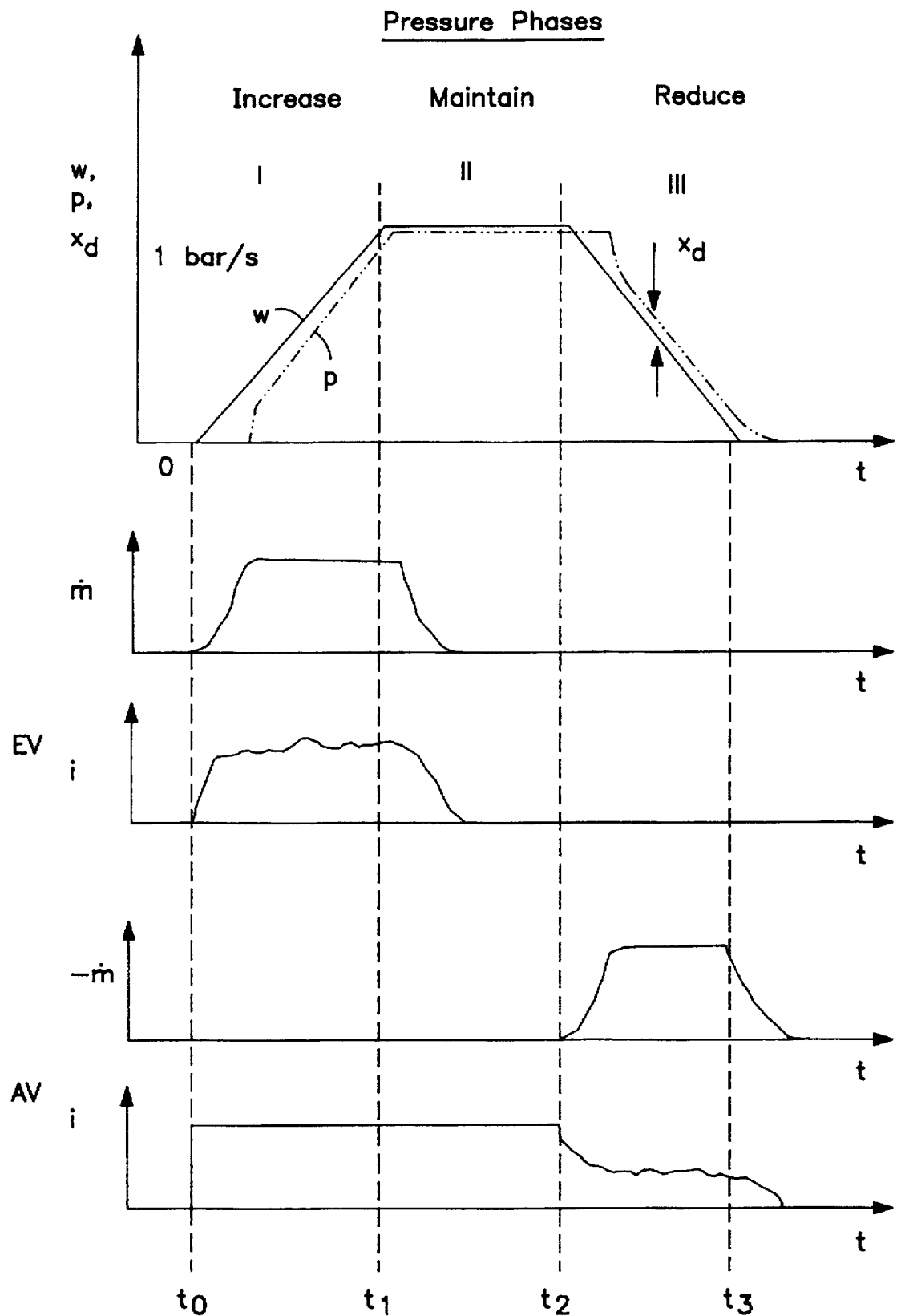
FIG. 4 illustrates the brake cylinder pressure as well as the appertaining mass flux and electrical currents of the inlet and discharge valve for a typical braking cycle.

FIG. 4 (at the top) shows the course of a typical braking action over time t. It consists of three pressure phases, i.e. increasing (I), holding (II) and lowering (III). The command variable w, which is given by the driver, the pressure p which builds up in the brake cylinder as a result of the control process, as well as the control deviation $X_d$ are shown. The ramp-like course is typical for the major part of all braking processes.

FIG. 4 (center) shows the mass flux $\dot{m}$ for the inlet valve (EV) during the braking process as well as the current i supplied by the controller (6) through the valve. As can be seen, the inlet valve is actuated with a nearly constant current from point in time $t_0$ until point in time $t_1$. As a result the valve opens to a median throttle position. This also results in a constant volume flux $\dot{m}$ that causes the pressure p to increase in a nearly linear manner. The pressure increase p is delayed compared to the command variable w because of the valve hysteresis and the response delay in the valve and the path.

The conditions shown in FIG. 4 (at the bottom) are somewhat different for the discharge valve (AV) which, contrary to the inlet valve (EV), is open in its non-excited (i=0%) state (see FIG. 3). This valve must therefore be closed at time $t_0$, i.e. at the beginning of braking, by a full current (i=100%) so that pressure can build up in the brake cylinder (4). At point in time $t_2$, i.e. at the beginning of the of pressure drop, the current I is lowered so that a median throttling position occurs in the range from $t_2$ to $t_3$ (end of braking). This results in a median, nearly constant volume flux $\dot{m}$. This also results in a nearly constant pressure drop in the brake cylinder (4).

Within the middle range between $t_1$ and $t_2$ the pressure is maintained. In this case the inlet valve is not actuated, i.e. it remains closed, while the discharge valve is fully actuated so that it too is closed. In non-braked operation, i.e. before $t_0$ and after $t_3$, the two valves are not actuated electrically. As a result the inlet valve is closed and the discharge valve is open.

FIG. 5 shows the schematic diagram of the pressure control apparatus according to the present invention in greater detail. In this figure the circuit blocks which have the same function as in the diagram of FIG. 1 are given the same reference numbers as in FIG. 1. This embodiment pertains to a braking pressure control in a utility vehicle. Command variable w, the signal of a (so-called) pedal-operated brake valve (20), is transmitted to the controller (6). The pedal-operated brake valve (20) has an electric output instead of a pneumatic output. The output voltage of the brake valve (20) is analog, and is proportional to the position of the pedal or the braking intention of the driver. As an additional command variable, the output signal of an ABS electronic system (21) is supplied which scans the rotational behavior of the vehicle wheels by means of wheel sensors (22) and transmits a signal in a known manner for the venting of the appertaining brake cylinder when an excessive brake slip is recognized. Appropriate measures cause the output signal of the ABS electronic system (21) to be retransmitted in preference to the output signal of the pedal-operated brake valve (20). Additional input magnitudes, e.g. the signal of a hand brake or the signal of an ALB (automatic load-dependent brake) can be superimposed.

The controller (6) now compares the pressure value p in the brake cylinder (4) after conversion into an electric magnitude x in a pressure/voltage converter (5) with the command variable w in a difference former (9), resulting in the so-called control deviation $x_d$. The latter is transmitted to a conventional PI controller (10, 11) for the inlet valve EV and the discharge valve AV. The controller (10, 11) amplifies the input signal, i.e. the control deviation $x_d$, whereby the precise amplification characteristic or structure of the controller can be altered by a pressure phase detector (18). The mentioned pressure phase detector (18) receives as input the value of the command variable w and recognizes from it which pressure phase (I, II, or III) is appearing at that moment. This recognition is accomplished by comparing the current command variable w with the previous history of the command variable w which is stored in the pressure phase detector (18).

Each of the two individual controllers (10) and (11) have two separate outputs for their P (proportional) component as well as for their I (integral) component. The two components of each controller are added together and retransmitted to a pre-control. Here a stationary pilot control value $y_v$ (conductor (13)) as well as a variable pilot control value $\Delta y_v$ (conductor (19)) are added to the output signal of the controller (11). Corresponding values are added via conductors (12, 17) to the output signal of the controller (10).

The stationary pilot control values $y_v$ are empirically determined from samples of the valves used so that their operating points AP are already nearly reached. The purpose of the pilot control is to reach the operating point (AP) of the valves (see FIGS. 2, 3) as quickly as possible and to thus relieve the controllers (10, 11) of this task. This results in shorter control times.

As explained above, the operating point (AP) is the state at which the valve seat is just lifting off, and is the state at which the proportional range of the pilot valves begins.

As braking begins, the current value of the operating point must be reached as rapidly as possible. For this purpose, the pilot control value is applied to the valves immediately at the beginning of braking to a valve selection logic (14) (see below). It would also be possible to find the precise necessary pilot control currents by investigating each valve, e.g., by sensing the lifting of the valve seats by means of a built-in force or distance sensor, and to measure and store the appertaining currents. However, this method would be too imprecise or too expensive. Accordingly the present invention uses another method as explained below.

The variable pilot control values $\Delta y_v$ arrive via conductors (17, 19) from (so-called) adaptation devices (16, 15) which are connected to the respective I outputs of the individual controllers (10, 11) and also receive the value of the command variable w as well as the output signal of the pressure phase detector (18). The precise function of the adaptation devices shall be explained below in greater detail.

The signals of the two individual controllers (10, 11) are transmitted to the valve selection logic (14). The latter decides which control signals shall be allowed to go through to the actuator valves (2, 3).

The output signals of the valve selection logic (14) ($y_{EV}$ for the inlet valve EV and $y_{AV}$ for the discharge valve AV) are transmitted via two amplifiers (7, 8) in the form of current values $i_{EV}$ and $i_{AV}$, to the solenoid valves (2, 3). The valves have a non-linear characteristic as indicated by the diagrams (23, 24). In addition, a hysteresis is also present, as is to be indicated by the diagram (25). A pressure fluid reservoir (1) as well as an outlet (27) (sound damper) are connected to the solenoid valves.

The valves (2, 3) produce a volume flux v̇ (air stream) which is conveyed through pipe lines or hoses to the brake cylinder (4). The diagram (26) represents here the characteristics of the path covered (which includes pipelines, containers, etc.).

The air (oil) pressure p which is built up in the brake cylinder (4) is converted in the pressure/voltage converter (5) into a voltage and is brought back in the form of actual value x to the previously mentioned difference former (9). This closes the control circuit.

The characteristic valve lines (full lines) shown in FIGS. 2 and 3 apply only to a stationary (slow) excitation of the valves. During a running control operation, the central characteristic line, shown by dashes, applies instead. By adding a dither signal, the hysteresis is greatly diminished and is rendered negligible. The dither signal is a high-frequency current superimposed on the valve currents $i_{EV}$, $i_{AV}$.

The precise position of the characteristic line shown by dashes may vary from valve to valve. For this reason the precise operating point (AP) is memorized for each valve during the operation. This takes place in the adaptation devices (16, 15) (FIG. 5) which add an individually memorized pilot control value $\Delta y_v$ to the fixed pilot control value $y_v$.

Figure 6:
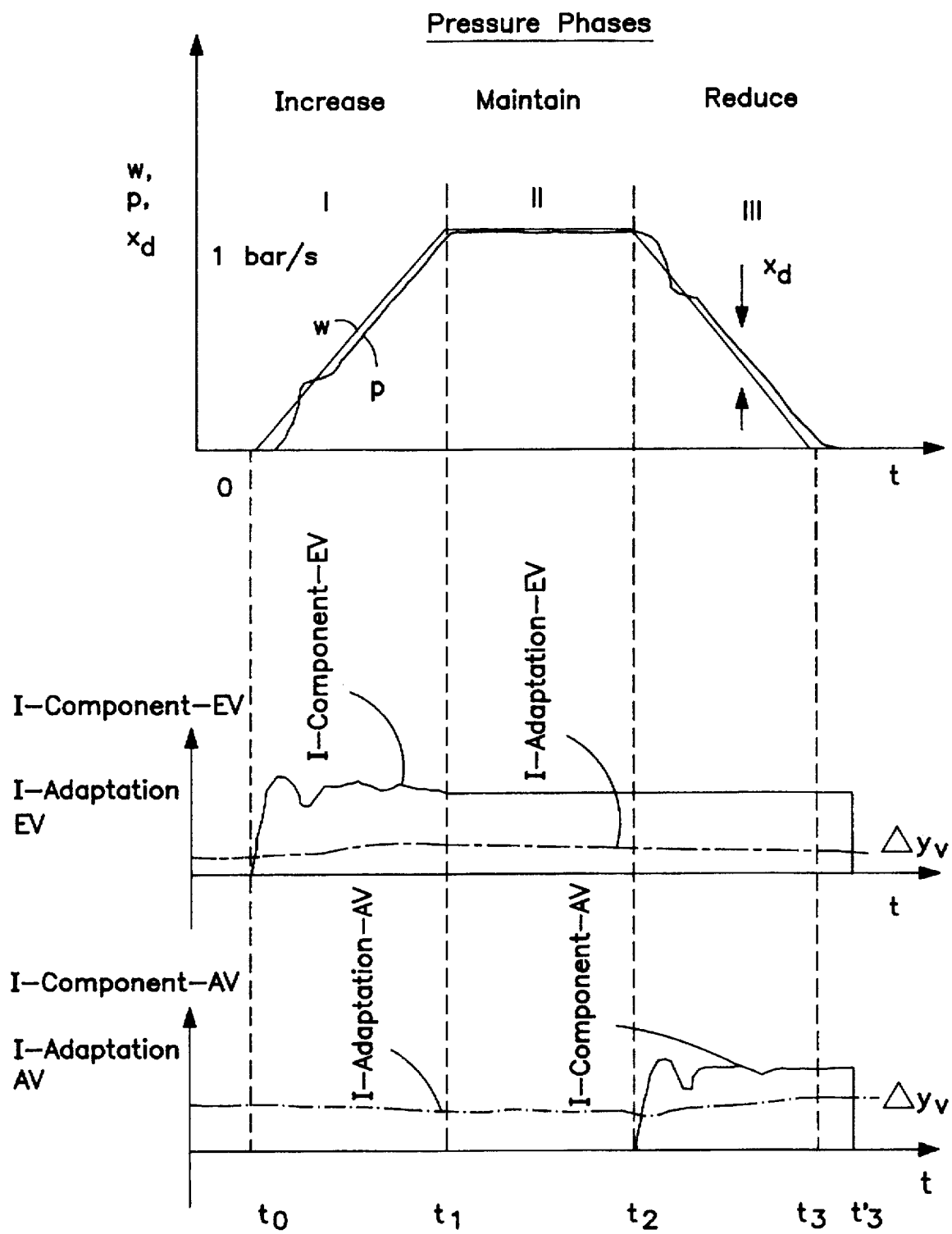
FIG. 6 illustrates the pressure phases occurring in a braking cycle as well as the learning process according to the invention in order to overcome the response delay time zone of the solenoid valves.

The individual pilot control values $\Delta y_v$ are found as follows. In FIG. 6, in the upper part, the course of typical braking over a time t is shown. The course consists of three pressure phases: increasing (I), holding (II) and lowering (III). While the course of the command variable w is trapezoidal, the course of the fully stabilized pressure p (dots and dashes) trails behind (or overshoots) the command variable w by the difference $X_d$.

In the lower portion of FIG. 6, also over a time t, the I-component of the controllers (10, 11) is shown for the inlet valve EV and for the discharge valve AV. As can be seen, starting at the point in time $t_0$, as pressure increases an approximately rectangular I component is contained in the output signal of the controller (10). After the point in time $t_2$ the I component is nearly constant. Here the pressure is fully stabilized with maximum precision in the pressure holding phase.

If no greater control deviation $x_d$ occurs in the pressure holding phase (II), the controller (10) for the inlet valve is taken out of the control operation by the valve selection logic (14). The I value remains constant until control is completed (at time $t_3$) but it no longer has any influence on the pressure. After $t_2$, the I value is lowered to zero by the computer program at time $t'_3$.

A similarly formed I component applies to the pressure lowering phase (III) for the discharge valve AV, lasting from time $t_2$ to $t_3$. As of $t_3$, the pressure is brought down with sufficient precision back to zero. This I component is also set to zero by the computer program at time $t'_3$.

In the adaptation devices (15, 16) the I components of several braking operations are again integrated. This integration occurs during the first five to ten braking operations. The integration value itself is arrived at during the periods going from $t_0$ to $t_1$ (pressure increase) or from $t_2$ to $t_3$ (pressure lowering) and is proportional to the pilot control value $\Delta y_v$ to be learned.

In the two cases shown for the inlet valve and the discharge valve, the previous value for $\Delta y_v$ increases for the inlet valve and the discharge valve after completion of the braking procedure. However, it is also possible for the value for $\Delta y_v$ to decrease again (in case of a negative I component). In either case it is assumed that after five to ten brake applications a useable median value is attained which, in combination with the fixed pilot control value $Y_v$, is very close to the actual operating point of the valve in question and no longer changes significantly. This value $\Delta y_v$ which typically is different for the inlet valve EV and for the discharge valve AV, is additively input to the fixed pilot control value $y_v$ as mentioned earlier. This results in an optimal, rapid adjustment of the desired command variable w.

The described memorizing process is repeated with each new start of the vehicle. It is completed after approximately 5 to 10 brake applications. Thanks to the currently fresh calculations of $\Delta y_v$, the temperature influences and aging processes of the valves (2, 3) are taken into account and their effects compensated. The last calculated $\Delta y_v$ value can be entered in a memory (EEPROM) and can be used again when the vehicle is next started.

In order to block out unfavorable or extreme states from the memorizing process, memorization is allowed only when the brake pressure changes of the desired value w falls within a median range of approximately 0.25 to 2 bar/s. For this purpose the adaptation devices (16, 15) are given the output value of the pressure phase detector (18) which contains this information.

Similarly, memorization is allowed only when the braking pressure rates between approximately 0.5 bar and 6 bar (normal conditions). For this purpose the adaptation devices (16, 15) are additionally given the value of the command variable w. This causes the blocking out of control ranges with unsteady adjustment processes or with insufficient supply pressure at the valve.

The operating point of that valve which is currently actively looped into the control circuit is always learned. This valve can be determined through the output signal of the pressure phase detector (18) since the latter distinguishes between the different pressure phases: increasing, holding and lowering.

An adaptation by the devices (15, 16) is not further permitted, or is stopped, when the ABS or the ASR pressure evolutions are controlled by the pressure valves (2, 3), since (typically) great control dynamics and control errors occur with these functions.

The adaptation is also stopped if there is an overshooting in the display ranges in the microcomputer of the adaptation devices (15, 16). Finally adaptation is prevented if the electrical operating voltage is insufficient in order to operate the valves (2, 3).

The calculated pilot control value $\Delta y_v$ can also be monitored within the adaptation devices (15, 16) for adherence to a nearly constant value. If the new values deviate to some greater extent from a stored normal value it may be concluded that a valve error exists.

While the invention has been described by reference to specific embodiments, this was for purposes of illustration only. Numerous alternative embodiments will be apparent to those skilled in the art and are considered to be within the scope of the invention.

I claim:

1. Pressure control process in a braking system of a vehicle, comprising the steps of:

transmitting a command variable from a driver to a controller of at least one valve, said at least one valve having an operating point, determining said operating point of said at least one valve with a pilot control value during a series of brake cycles, said pilot control value consisting additively of a constant value and a variable value, determining a new variable value after each of said brake cycles, storing said new variable value after each of said brake cycles, determining said variable value based on said new variable values, stored for each of said brake cycles, updating said pilot control value with said variable value, and controlling said at least one valve with said pilot control value.

2. Process as in claim 1, wherein said controller has an integration component, and said variable component is calculated as the integration result of said integration component of said controller for the duration of a pressure change for said at least one valve.

3. Process as in claim 2, wherein said pilot control valve is determined in less than ten brake cycles.

4. Process as in claim 1, wherein said storing of said new variable value is carried out only when the said command variable changes at a rate between 0.25 bar/s and 2 bar/s.

5. Process as in claim 1, wherein said storing of said new variable value is carried out only when said command variable is between 0.5 bar and 6 bar.

6. Process as in claim 1, wherein said braking system has an ABS, and said storing of said new variable value is not carried out when said ABS is activated.

7. Process as in claim 1, further comprising monitoring operation of said braking system by receiving characteristic values of said braking system, and storing of said new variable value is not carried out.

8. Process as in claim 1, wherein said valve has an operating voltage, and said storing of said new variable value is not carried out if said operating voltage is insufficient.

9. Process as in claim 1, wherein said at least one valve has an operating voltage, and said pilot control value is stored in a non-volatile memory module each time said operating voltage is switched off and said stored pilot control value is used as said pilot control value at the next start of the vehicle.

10. Process as in claim 1, said process further comprising the steps of monitoring said variable value, declaring a valve error if said monitored variable value deviates significantly from a normal variable value, connecting an integration component of said controller to an adaptation device, said integration component of said controller having an integration constant, said adaptation device designed as an integrator having an integration constant less than said integration constant of said controller, transmitting said command variable and an output signal of a pressure phase detector to said adaptation device, and additively connecting an output of said adaptation device and an output of said controller and said pilot control value.

11. Process as in claim 1, wherein said braking system has an ASR, and said storing of said variable value is not carried out when said ASR is activated.

12. Process as in claim 1, wherein said brake system further having an operating voltage, and said pilot control value is stored in a non-volatile memory at fixed intervals, and that said stored pilot control value is used first at the next start of the vehicle.

* * * * *